(12) United States Patent
Galvan (10) Patent No.: US 11,796,746 B2
(45) Date of Patent: Oct. 24, 2023

(54) COMMUNICATION SYSTEM QUICK CONNECTION AND ISOLATION APPARATUS

(71) Applicant: The United States of America, as represented by the Secretary of the Navy, Crane, IN (US)

(72) Inventor: Jaime Galvan, Bloomington, IN (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 23 days.

(21) Appl. No.: 17/746,222

(22) Filed: May 17, 2022

(65) Prior Publication Data
US 2022/0373747 A1 Nov. 24, 2022

Related U.S. Application Data

(60) Provisional application No. 63/191,423, filed on May 21, 2021.

(51) Int. Cl.
*G02B 6/00* (2006.01)
*G02B 6/38* (2006.01)

(52) U.S. Cl.
CPC ......... *G02B 6/3897* (2013.01); *G02B 6/3834* (2013.01)

(58) Field of Classification Search
CPC .. G02B 6/3897; G02B 6/3834; G02B 6/3895; G02B 6/00; H04Q 1/025
See application file for complete search history.

(56) References Cited

U.S. PATENT DOCUMENTS

| | | | |
|---|---|---|---|
| 8,712,196 B2* | 4/2014 | Shang | H04B 10/40 385/12 |
| 9,182,253 B2* | 11/2015 | Courchaine | G02B 6/3897 |
| 2014/0205285 A1* | 7/2014 | Jiang | G02B 6/4246 398/45 |

* cited by examiner

*Primary Examiner* — Jennifer Doan
(74) *Attorney, Agent, or Firm* — Naval Surface Warfare Center, Crane Division; Patrick B. Law; Christopher J. Feigenbutz (57) ABSTRACT

Provided is a secure quick communication system disconnect switch box that enables remote verification of communication path connection or disconnection status. The box utilizes a lid having an affixed jumper circuit/assembly bridging or coupling at least two network connections. When the lid to the switch box is attached, the at least two computers/networks are connected via the jumper circuit/assembly. When the lid is removed from the switch box, the jumper circuit/assembly is disconnected from the at least two computer/networks, thereby disconnecting and isolating the otherwise coupled computers/networks. Removal of the lid additionally exposes network maintenance/access ports to provide access to one or more of the computers/network. When the lid is closed, the network maintenance/access ports are inaccessible to the user.

18 Claims, 11 Drawing Sheets

COMMUNICATION SYSTEM QUICK CONNECTION AND ISOLATION APPARATUS

CROSS-REFERENCE TO RELATED APPLICATIONS

The present application claims priority to U.S. Provisional Patent Application Ser. No. 63/191,423, filed May 21, 2021, and entitled "SECURE QUICK COMMUNICATION SYSTEM DISCONNECT," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200335US02) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD

The field of invention relates generally to networked communication systems. More particularly, the field of invention pertains to a networked communication system quick isolation/disconnection and connection apparatus configured to quickly isolate and/or connect a networked device in networked communication systems.

BACKGROUND

A problem often encountered when having two computers connected in one state and disconnected in another state, such as during a maintenance cycle, is that the computer must be removed for maintenance or troubleshooting. This is particularly problematic when dealing with avionic computers, such as when safety regulations require a computer to be removed from a network in flight, while at the same time a crew requires access to the connection. As can be appreciated, the need to isolate one computer/network during a maintenance cycle is imperative to keep from cross-contamination of network traffic from the maintenance computer to the operational network.

Currently, a user must remove the computer/network/hardware from a mounting rack or enclosure to physically disconnect the network cable from the computer/network/hardware. This procedure is not possible if the rack is installed in an aircraft and if the aircraft is in flight, for example. In a static position, gaining access to the back of the computer requires approval to remove the computer (e.g., "break the seal"). Removal of the computer/network/hardware also requires tools to remove the hardware from the rack/enclosure to gain access to the back of the computer/network where the network interface resides. When access is no longer required, approval and inspections must take place prior to the computer/hardware being remounted. As such, the tasking of accessing the network interface of a computer while installed in a rack is time consuming and costly.

SUMMARY

The present invention relates to a networked communication system quick connect/disconnect network or switch box that enables remote verification of a communication path connection or a disconnection status. The disclosed switch box utilizes a jumper circuit board spanning two network connections and a removable cover or lid that includes the jumper connection to complete the network connection. When the lid to the switch box is attached, two or more computers/networks are connected via the circuit board bridge and the jumper connection. When the lid is removed from the switch box, the jumper connection is removed from the bridge, which creates an isolated or non-complete networking circuit, thereby isolating or disconnecting the otherwise coupled computers/networks. Removal of the lid additionally may expose network maintenance/access ports within the box to provide the ability to access to one of the computers/network without removal of the computer. When the lid is attached on the switch box, the network maintenance/access ports within the box are inaccessible.

In other aspects, a network switch box for quick coupling and/or isolation of network connections is disclosed. The network switch box includes a housing having an exterior portion and an interior portion. Further, the box includes a first feedthrough network connector having first and second coupling ends and affixed in the housing, wherein the first feedthrough network connector is configured to accept network connections at both the exterior portion of the housing at a first coupling end and the interior portion of the housing at a second coupling end. Moreover, the box includes a second feedthrough network connector having third and fourth coupling ends and affixed in the housing, wherein the second feedthrough network connector is configured to accept network connections at both the exterior portion of the housing at the third coupling end and the interior volume of the housing at the fourth coupling end. Still further, the box includes a lid configured to be removably connected to the housing wherein the interior portion of the housing is enclosed and inaccessible when the lid is connected, and a jumper assembly affixed to a side of the lid configured to face the interior portion of the housing, the jumper assembly including first and second jumper network connectors that are electrically connected as a straight pass-through between the first and second jumper network connectors, wherein the first and second jumper network connectors are positioned to be aligned with the second and fourth coupling ends of the first and second feedthrough network connectors and communicatively couple with the second and fourth coupling ends when the lid is connected to the housing.

BRIEF DESCRIPTION OF THE DRAWINGS

The detailed description herein particularly refers to the accompanying figures in which.

DETAILED DESCRIPTION

The embodiments or examples of the invention described herein are not intended to be exhaustive or to limit the invention to the precise forms disclosed. Rather, the embodiments or examples selected for description have been chosen to enable one skilled in the art to practice the invention.

The present disclosure provide a network isolation access control/switch box that is configured to allow connection of a computer/network when the box is closed such as with a lid, and disable or disconnect the computer/network to gain access to another network/computer system. The switch box is configured to disallow two computers/networks to be connected simultaneously.

Figure 1:
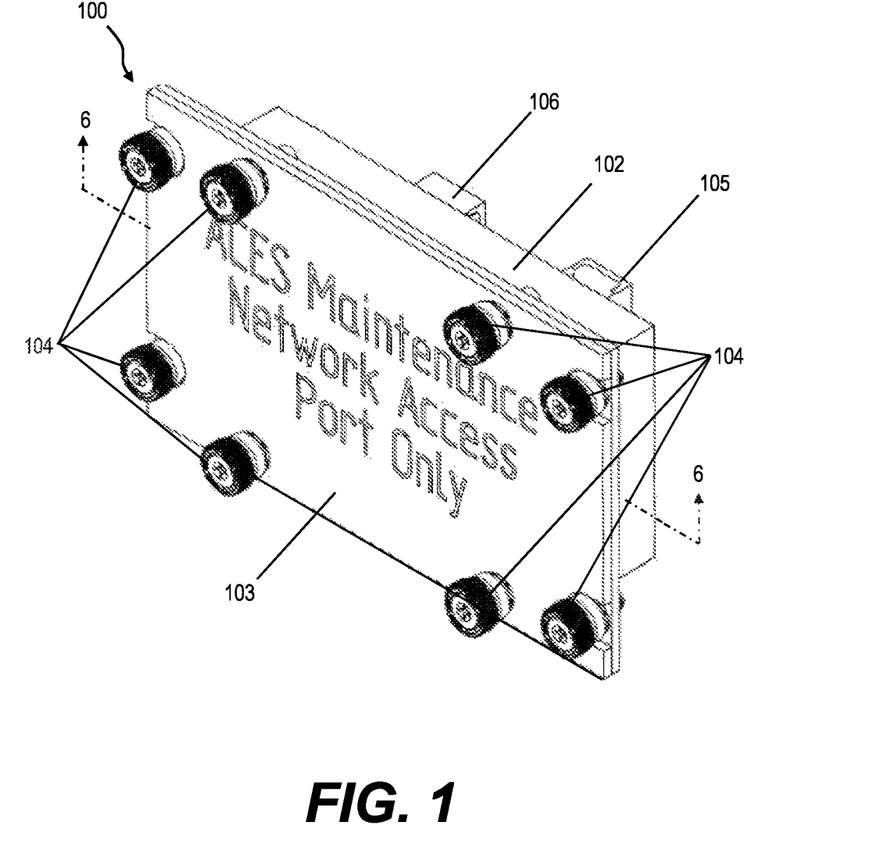
FIG. 1 shows an isometric view of a switch box according to some aspects of the disclosure.

FIG. 1 shows an isometric view of an example computer networking switch box 100 according to aspects of the present disclosure. The switch box 100 includes a housing 102, a lid 103, one or more lid fasteners 104 (e.g., knurled thumbscrews for quick on/off without tools), two or more first network feedthrough connectors 105 (e.g., e.g., an RJ45 Ethernet in-line feedthrough connector or coupler that couples one network cable (e.g., a COTS Ethernet cable) with an RJ45 termination plugged into one end of the feedthrough with another network cable with an RJ45 termination plugged into the other end of the feedthrough) effecting access ports, and one or more second network feedthrough connectors 106 also effecting access ports. It is noted that configuration of the feedthrough connectors allows network connections to be made at both ends of the connectors 105, 106, such that a connection can be made at an exterior portion of the housing 102, as well as in an interior portion or volume, as will be discussed later.

The housing 102 serves to hold the first and second network connectors 105, 106 and provides access to a computer/network while maintaining compatibility with commercial-off-the-shelf (COTS) network cables. When the lid 103 is attached to the switch box 100, the computers/networks are communicatively connected via a jumper or bridge circuitry (not shown in FIG. 1 but to be discussed in more detail below). When the lid 103 is removed from the switch box 100, the computers/networks attached to the jumper or bridge circuitry are disconnected and are isolated from each other. At the same time, the removal of the lid 103 may expose network maintenance/access ports (e.g., one side or end of the feedthroughs 105 or 106 exposed on an inside volume or portion 408 (See e.g., FIG. 4) of the housing 102) to allow a user to gain access to at least one of the computers/network coupled to the access port. While the lid 103 is closed (i.e., placed on the housing 102), the network maintenance/access ports are inaccessible to the user. Indicia or markings 107 may be disposed or printed on the lid 103 with information related to the switch box 100, such as "Maintenance Network Access Port Only," as illustrated.

Figure 2:
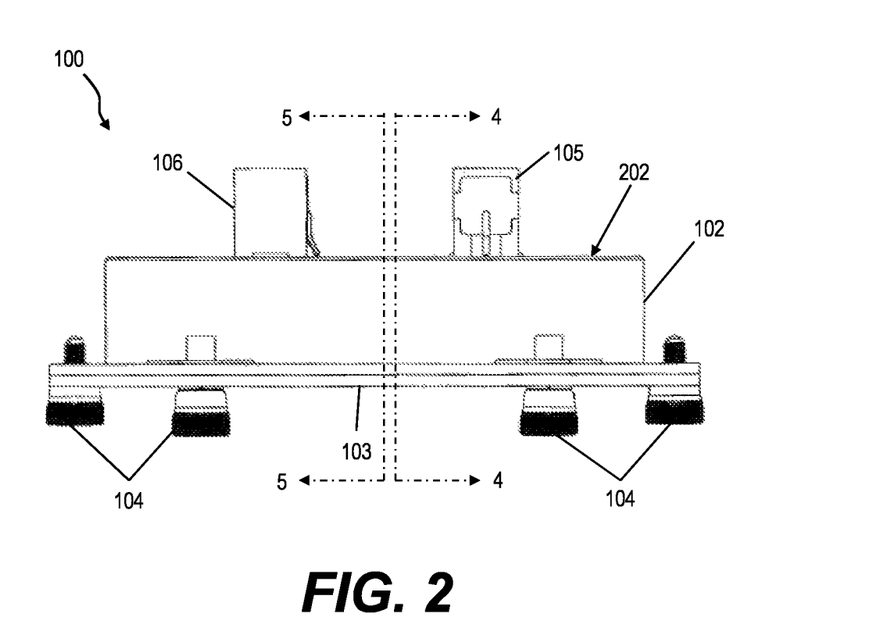
FIG. 2 shows a top view of the switch box of FIG. 1 according to some aspects of the disclosure.

FIG. 2 shows a top view of the switch box 100 illustrated in FIG. 1. As shown in this figure, the one or more first and second network feedthrough connectors 105 and 106 extend from a back surface 202 of the housing 102. These connectors 105 and 106 are configured to accept networking cables (e.g., the cable connectors/terminations) that, in turn, couple and/or network with various computers/networks. The design of the housing 102 permits the switch box 100 to be mounted forward of an access panel while providing access to the network cables. The lid 103 to the switch box is keyed through a jumper (not shown) built into the back of the lid 103, and further includes offset lid fasteners 104, which are preferably thumbscrews. The configuration of the lid and jumper keep the network connection secure from undesirable cross connection, which will be discussed in greater detail below. Of further note, the feedthrough connectors 105 are oriented 90 degrees from the orientation of feedthrough connectors 106 in this example. This different orientation may be used for differentiating between the pairs of feedthrough connectors (i.e., differentiate the two connectors 105 from the two connectors 106), as well as provide for different orientation of those connectors used for a jumper or connection means, which will be discussed later.

Figure 3:
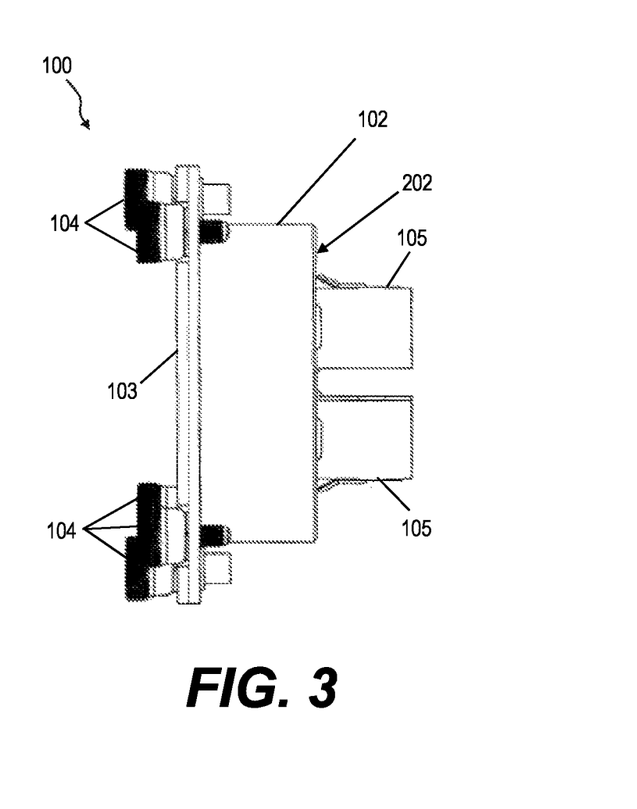
FIG. 3 shows a side view of the switch box of FIG. 1 according to some aspects of the disclosure.

FIG. 3 shows a right side view of the switch box 100 shown in FIG. 1. In this view, the two or more first network feedthrough connectors 105 are shown extending from the back surface or backside 202 of the housing 102. In this view, the second network feedthrough connectors 106 are obscured from view as they are, at least in this example, in line with the first network feedthrough connectors 105 in the horizontal direction.

Figure 4:
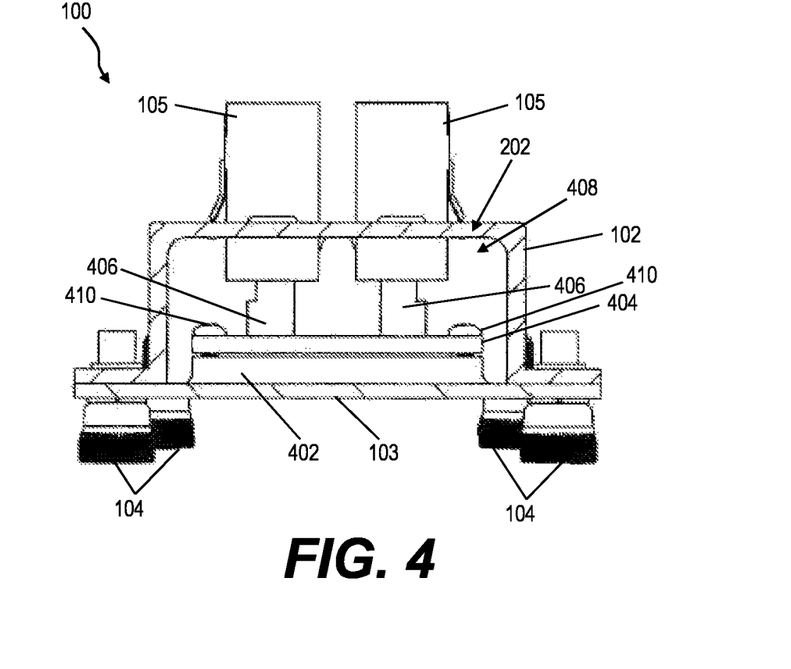
FIG. 4 shows a cross-sectional side view of the switch box of FIG. 1 according to some aspects of the disclosure.

FIG. 4 shows a cross-sectional side view of an example of the switch box 100 of FIG. 1 (and along the section lines illustrated in FIG. 2) according to some aspects of the disclosure. One or more of the first network connectors 105 are shown extending through apertures (to be discussed and illustrated later) in the backside 202 of the housing 102 into an interior volume 408 of the housing 102. A backside of lid 103 includes a jumper mounting portion or fixture 402 that serves to mount and affix a jumper assembly (e.g., 1100 as will be discussed later) to the lid 103. The jumper assembly includes a circuit board 404 with electrical connections therein and at least two jumper network connectors 406 (e.g., RJ45 male connectors or plugs) attached thereto that are configured to interface and couple with the first network connectors 105. In some aspects, the circuit board 404 is mounted to the jumper mounting fixture 402 with fasteners such as screws 410. Of note, the lid 103 to the switch box 100 is "keyed" (i.e., allowed only one mounting placement position) due to the construction of the mounting of the jumper assembly into the back of the lid 103 (as well as with the use of offset or irregular patterning of the locations of the lid mounting screws 104), and the unique coupling position of connectors 406 with connectors 105 (which may include that the orientation of the connectors 105 and connectors 406 is different from the orientation of the second connectors 106). Additionally, when the lid 103 is in mounted and in place with respect to housing 102, network connections are kept secure from undesirable cross connections. In further aspects, when the lid 103 is removed, the ends of the connectors 105 within the housing volume 408 are accessible such that network cables (e.g., RJ45 cables and plugs) may be coupled to the connectors 105 within the housing 102.

Figure 5:
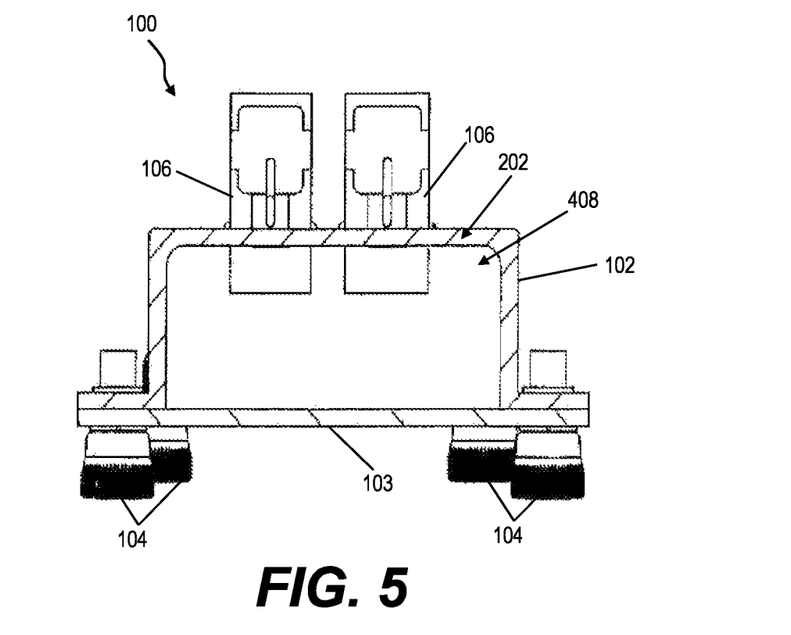
FIG. 5 shows another cross-sectional side view of the switch box of FIG. 1 according to some aspects of the disclosure.

FIG. 5 shows another cross-sectional side view of the switch box of FIG. 1 along the view line indicated in FIG. 2 according to some aspects of the disclosure. In this view, the second network connectors 106 may be seen passing through apertures in the backside 202 of housing 102 and extending into the interior volume 408. When the lid 103 is removed, the ends of the connectors 106 within the housing volume 408 are accessible such that network cables (e.g., RJ45 cables and plugs) may be coupled to the connectors 106 within the housing 102.

Figure 6:
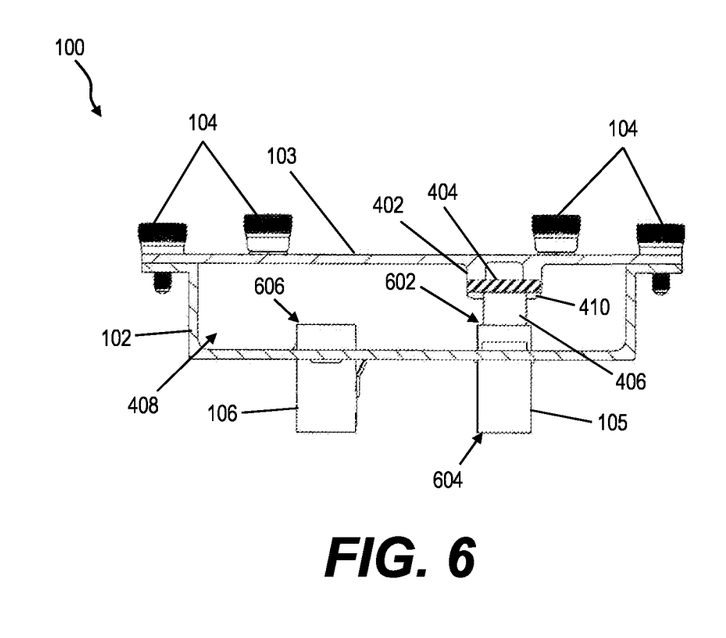
FIG. 6 shows yet another cross-sectional bottom view of the switch box of FIG. 1 according to some aspects of the disclosure.

FIG. 6 shows yet another cross-sectional bottom view of the switch box 100 along the section line shown in FIG. 1 according to some aspects of the disclosure. As illustrated, the jumper assembly including the connector 406 and circuit board 402 are coupled with the first network connector 105 when the lid 103 is in place. Additionally, the orientation of the connector 105 is also seen here as different (e.g., 90 degrees of rotation difference) from the orientation of connector 106, which, in part, serves to "key" the lid placement to only one placement position. Additionally, this figure (as well as FIGS. 4 and 5 above) illustrates that the connector 105 includes a first coupling end 602 facing or within the interior portion 408 of housing 102 and a second coupling end 604 facing or extending into the exterior portion of housing 102. As may be further seen here, the position or location of the jumper mounting portion or fixture 402 and the jumper assembly including the affixed circuit board 404 and jumper network connectors 406 serve to align with the connector 105 for achieving communicative coupling between the jumper assembly when the lid 103 is placed on the housing 102. Of further note, the other connector 105 includes the same geometry with first and second coupling ends 602, 604 (which could also be characterized as third and fourth coupling ends (without limit to one particular connector 105 or the other connector 105 for position or numbering purposes and for the appended claims, but merely to denote that there are two identical connectors 105 with two ends of a pass-through or feed-through connector so configured to receive two corresponding connectors 406 of the jumper assembly, as well as network connections external to the box 102). Of further note, the connectors 106 include first and second coupling ends 606, 608. It is noted that the coupling ends 602 and 604 may serve to effectuate as network maintenance/access ports when the lid 103 is removed from the housing 102.

Figure 7:
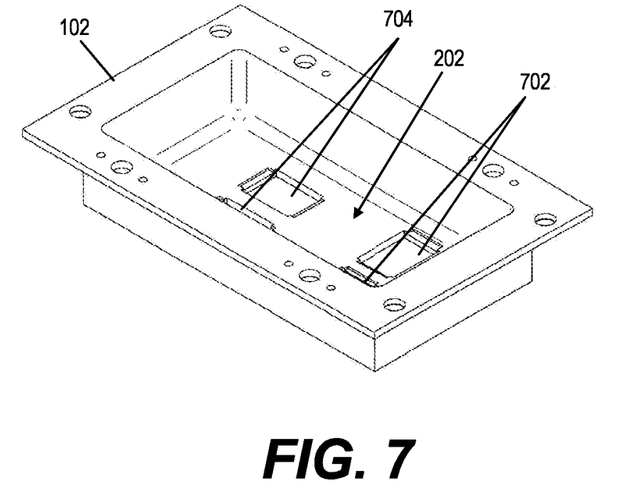
FIG. 7 shows an isometric view of one example of a construction of housing 102 for the switch box of FIG. 1 according to some aspects of the disclosure.

FIG. 7 shows an isometric view of the housing 102 without the network connectors 105 and 106. As may be seen, a portion of the housing 102 (e.g., the backside 202 portion) includes one or apertures 702 and 704, which receive and hold the first network connectors 105 and the second network connectors 106, respectively. Again, the use of feedthrough connectors or ports disposed in the apertures 702, 704 allow for network cables to be connected to both sides of the network connectors 105 and 106 (not shown). The housing 102 is a mountable enclosure which isolates, connects, and provides access to a computer/network while maintaining compatibility with COTs network cables. Additionally, the housing 102 may be configured to be mounted forward of an access panel, with the network cables installed through the RJ45 feedthrough connectors 104 and 106.

Figure 8:
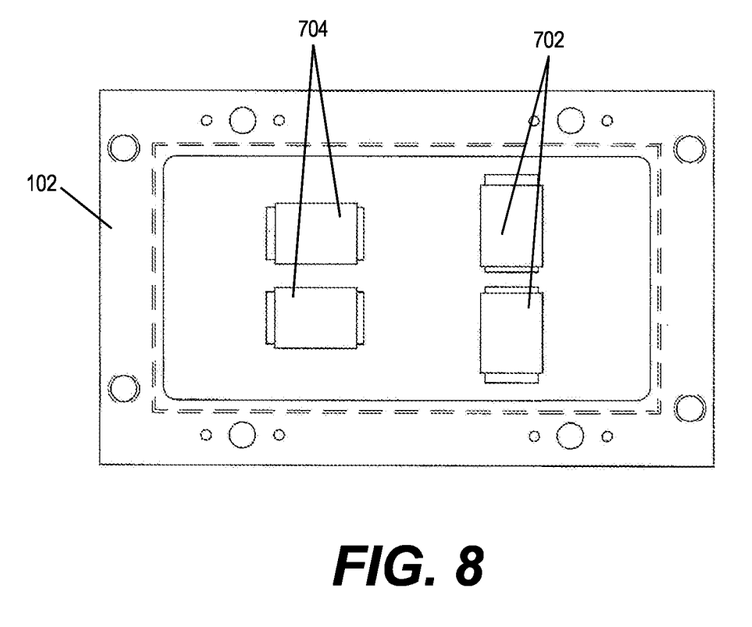
FIG. 8 shows a top view of the housing 102 illustrated in FIG. 7.

FIG. 8 shows a top or plan view of the housing 102 illustrated in FIG. 7, which is shown without the network connectors 105 and 106. As may be seen, a portion of the housing 102 (e.g., the backside 202 portion) includes one or apertures 702 and 704, which receive and hold the first network connectors 105 and the second network connectors 106, respectively.

Figure 9:
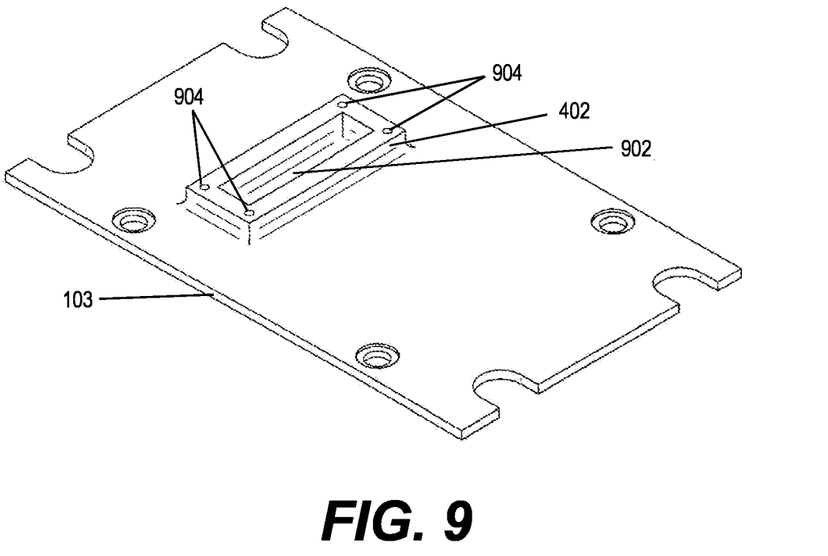
FIG. 9 shows an isometric view of a backside of the lid of the switch box of FIG. 1 according to some aspects of the disclosure.

FIG. 9 shows an isometric view of a backside of the lid 103 of the switch box 100 of FIG. 1 according to some aspects of the disclosure. As illustrated, the backside view shows the jumper mounting fixture 402 disposed on and protruding a predetermined height from the backside of the lid 103. While the fixture 402 is illustrated as a walled trough with an interior volume 902 that allows space for any raised portions of the circuit board 404 facing toward the lid 103, those skilled in the art will appreciate that other geometries are contemplated as well that serve to mount and affix a jumper assembly to the lid at a set location and height to align and couple with the connectors 105. Further, the fixture 402 may include one or more holes (e.g., threaded bores) for receiving affixing or fastening means to secure the circuit board 404 to the fixture 402, such as screws 410.

Figure 10:
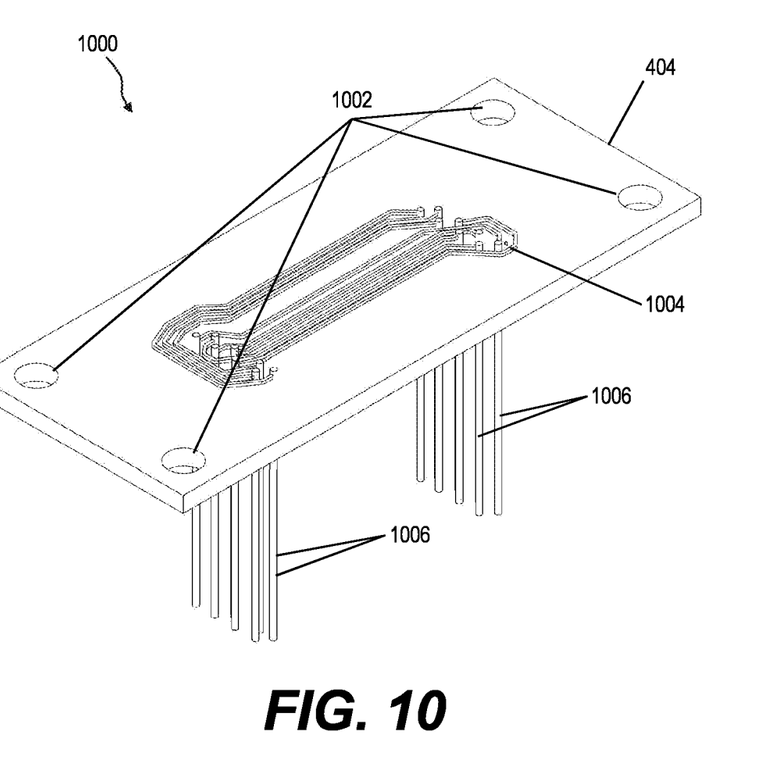
FIG. 10 shows an isometric view of a portion of a jumper assembly for use with the lid shown in FIG. 9 according to some aspects of the disclosure.

FIG. 10 shows an isometric view of a portion 1000 of the jumper assembly discussed earlier to illustrate an exemplary construction thereof. In this example, the circuit board 404 includes apertures or holes 1002, which are configured to align with the holes or bores 904 in the jumper mounting fixture 402. Disposed or printed on and/or within the circuit board are one or more printed circuits, traces, and/or conductors 1004 that are configured to implement a straight pass-through or connection (e.g., jumper) of two network connectors to effectuate a direct connection between two networks (e.g., two computers). A plurality of conductors 1006 electrically couple with the printed circuitry 1004 and extend perpendicular from a surface, portion, or side of the circuit board as shown These conductors 1006, in one example, will be located or encased within or incorporated into a connector or coupling (e.g., the at least two jumper network connectors 406 discussed before) as will be discussed below.

Figure 11:
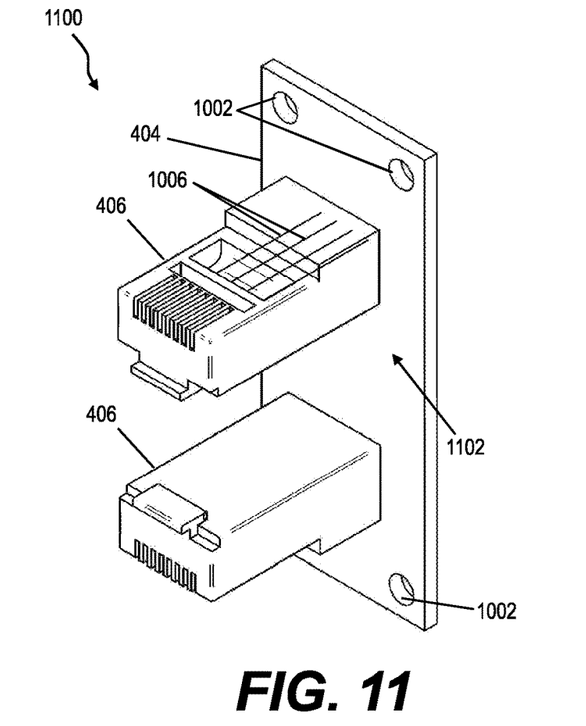
FIG. 11 shows an isometric view of an assembled jumper assembly incorporating the aspects of FIG. 10 and for use with the lid shown in FIG. 9 according to some aspects of the disclosure.

FIG. 11 illustrated an isometric view of an exemplary completed jumper assembly or apparatus 1100 according to some aspects. As shown, the assembly 1100 includes circuit board 404 and the at least two jumper network connectors 406 extending perpendicularly from a surface 1102 (which could be considered a top or bottom surface depending on point or reference, but also a first surface 1102) of the jumper assembly 1100. As also illustrated by ghost lines, each jumper network connector 406 encompasses or encloses the plurality of conductors 1006.

It is noted here that, in some aspects, use of the jumper assembly (e.g., one or more of the elements 402, 404, 406, and/or 410) with the switch box 100 would necessitate at least two of the first types of connectors 105 as, by definition, a jumper is coupling at least two circuits or networks. Thus, the box 100 is configured with first and second pass-through connectors 105, but may not necessarily include the second connectors 106, one of the connectors 106, or a plurality of the second connectors 106.

Figure 12:
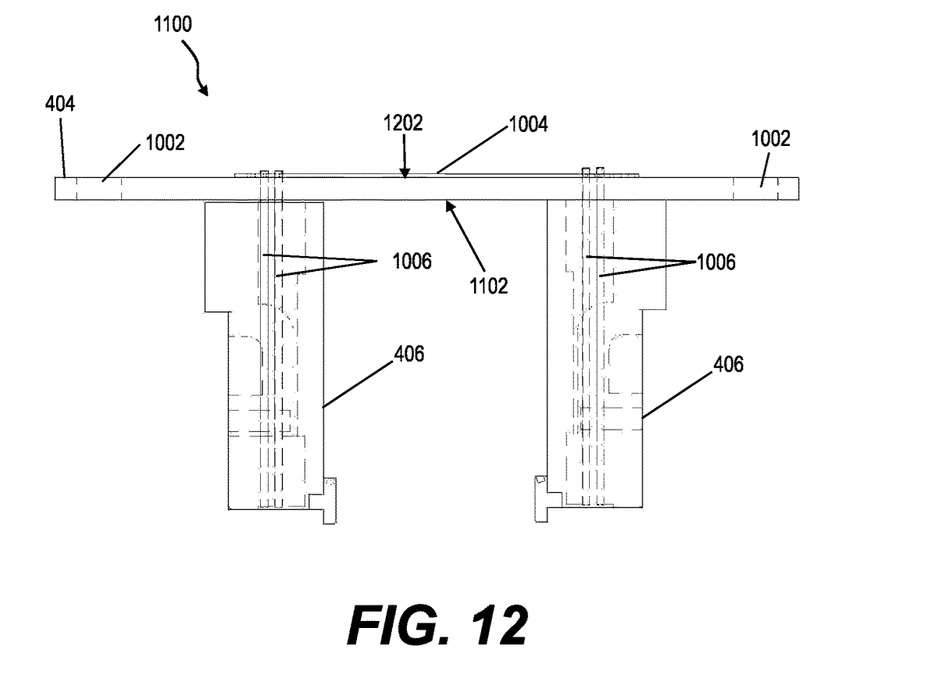
FIG. 12 shows a side view assembled jumper assembly of FIG. 11.

FIG. 12 illustrates a side view of the jumper assembly 1100 of FIG. 11. As may be seen in this figure, the conductors 1006 extend from the printed circuitry 1004 on a second side 1202 of the circuit board 404, through the circuit board 404 and through the at least two jumper network connectors 406. In operation, the jumper assembly 1100 is designed to complete the network connection between networks or computers connected to the network connectors 105, in turn coupled with connectors 406. The jumper assembly 1100 thus serves to complete the coupling or connection of the networks or computers when the lid 103 is attached to the housing 102. When the lid 103 is removed from housing 102, the jumper assembly 1100 is disconnected, causing disconnection of the two computers/networks thereby isolating the two computers/networks from each other. Additionally, removal of the lid 103 exposes network maintenance/access ports (i.e., the other sides of the connectors 105 and 106) to gain access to one of the computers/network.

Figure 13:
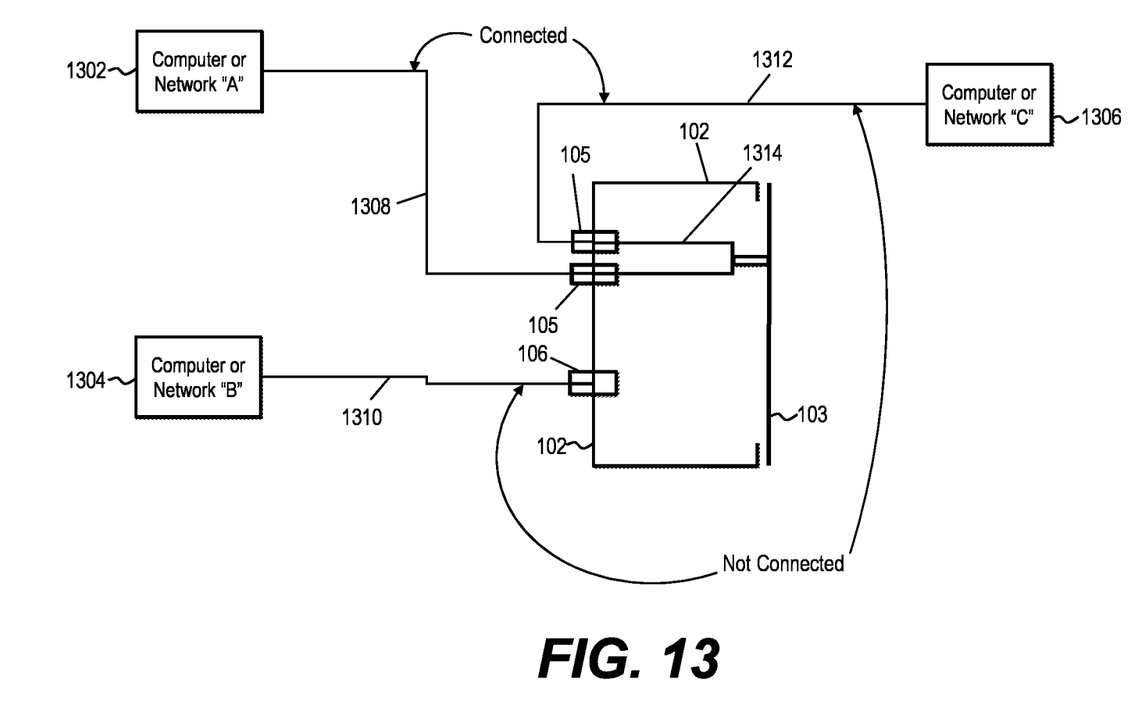
FIG. 13 shows an example of a connection diagram with multiple computers/networks when the switch box is closed with the lid according to aspects of the disclosure.

FIG. 13 shows an example of a connection diagram of multiple computers and/or networks 1302, 1304, and 1306 (termed also computer/network "A," computer/network "B," and computer/network "C") coupled or electrically connected to a closed switch box housing 102 including lid 103. The computers 1302, 1304, and 1306 are each coupled to the switch box 100 via respective network cables (e.g., Ethernet cables) 1308, 1310, and 1312. As shown, when the switch box 100 is closed (with the lid 103 on) all computers 1302 and 1306 are communicatively coupled or connected together via a jumper assembly 1314 affixed to the lid 103. Computer 1304, coupled with feedthrough connector 106, is isolated from the other computers/networks.

Figure 14:
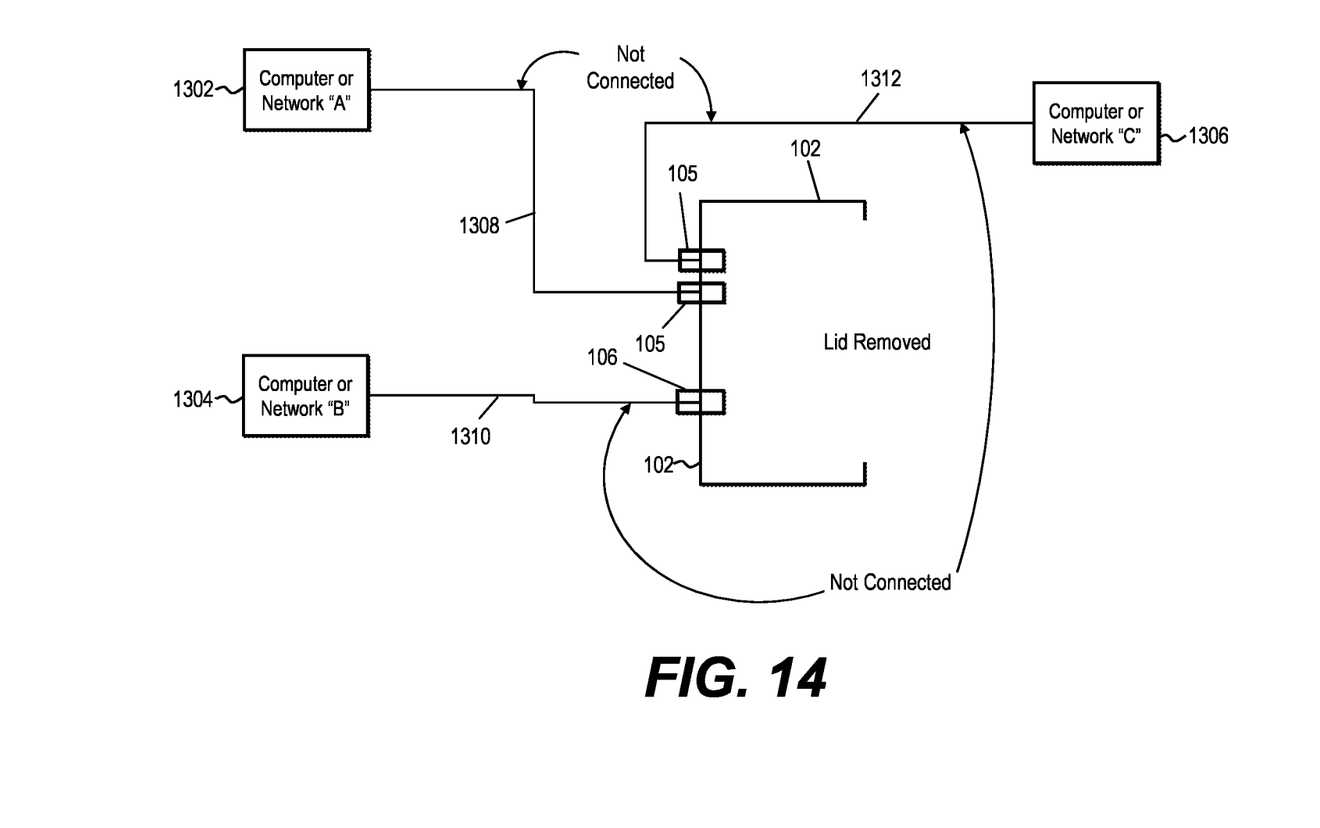
FIG. 14 shows an example of a connection diagram with multiple computers/networks when the switch box is open according to aspects of the disclosure.

FIG. 14 shows an example based on FIG. 13 of a connection diagram of multiple computers and/or networks 1302, 1304, and 1306 coupled to the connections 105 or 106 in housing 102 with network connections 1308, 1310, and 1312 to an open switch box 102 without a lid 103. As shown, when the switch box is open (with the lid off) all of the computers are communicatively isolated and/or disconnected from one another.

Figure 15:
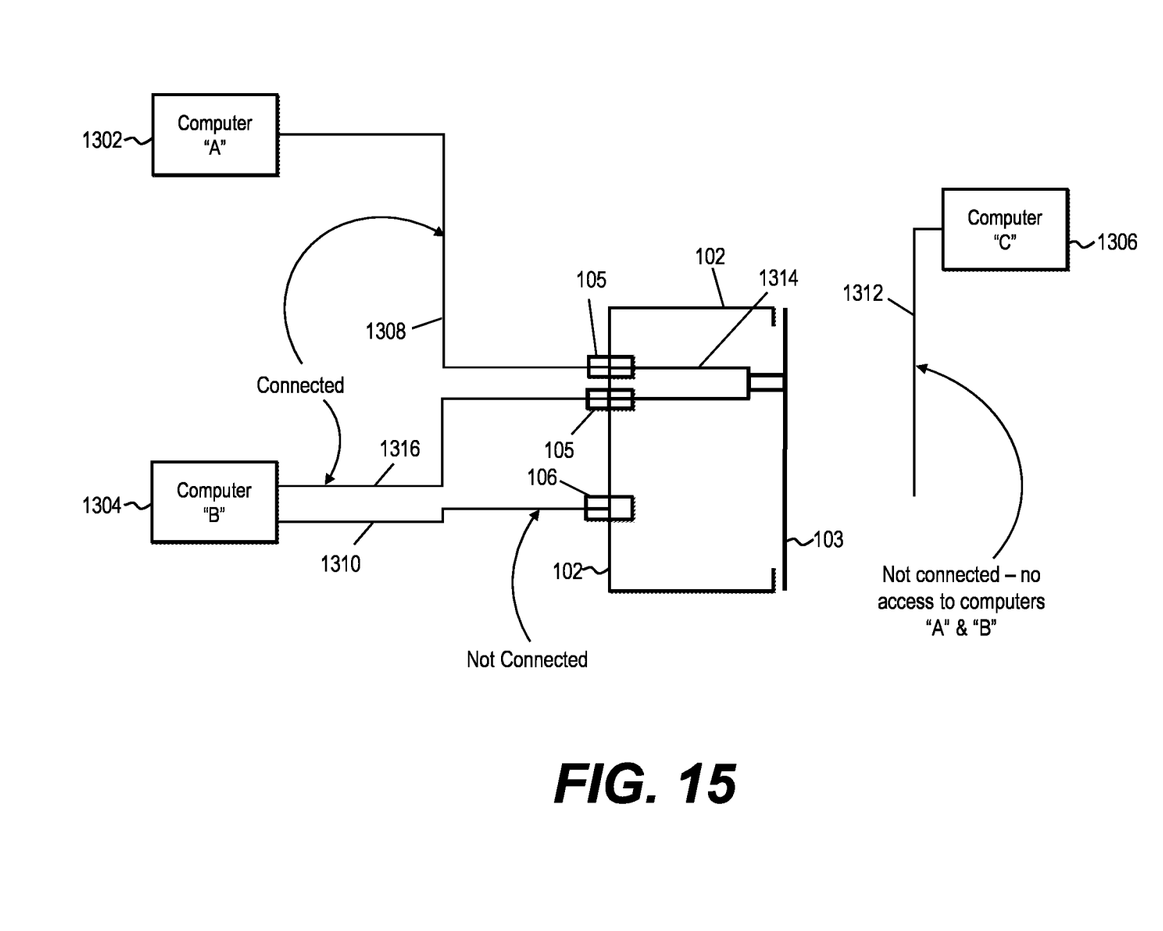
FIG. 15 shows another example of a connection diagram with multiple computers/networks when the switch box is closed with the lid according to aspects of the disclosure.

FIG. 15 shows another example of a connection diagram of computers and/or networks 1302, 1304, and 1306 connected to switch box housing 102 with a closed lid 103. In this example, computers and/or networks 1302 and 1304 are coupled via network cables 1308 and 1316 and the jumper assembly 1314. Here computer "B" 1304 is coupled to connector 105 and computers "A" and "B" are networked when the lid 103 is connected. Additionally, computer 1306 is shown disconnected as there is no connection of network cable 1306 to the box and, thus, this computer/network "C" has no access to the "A" and "B" network/computers 1302 and 1304.

Figure 16:
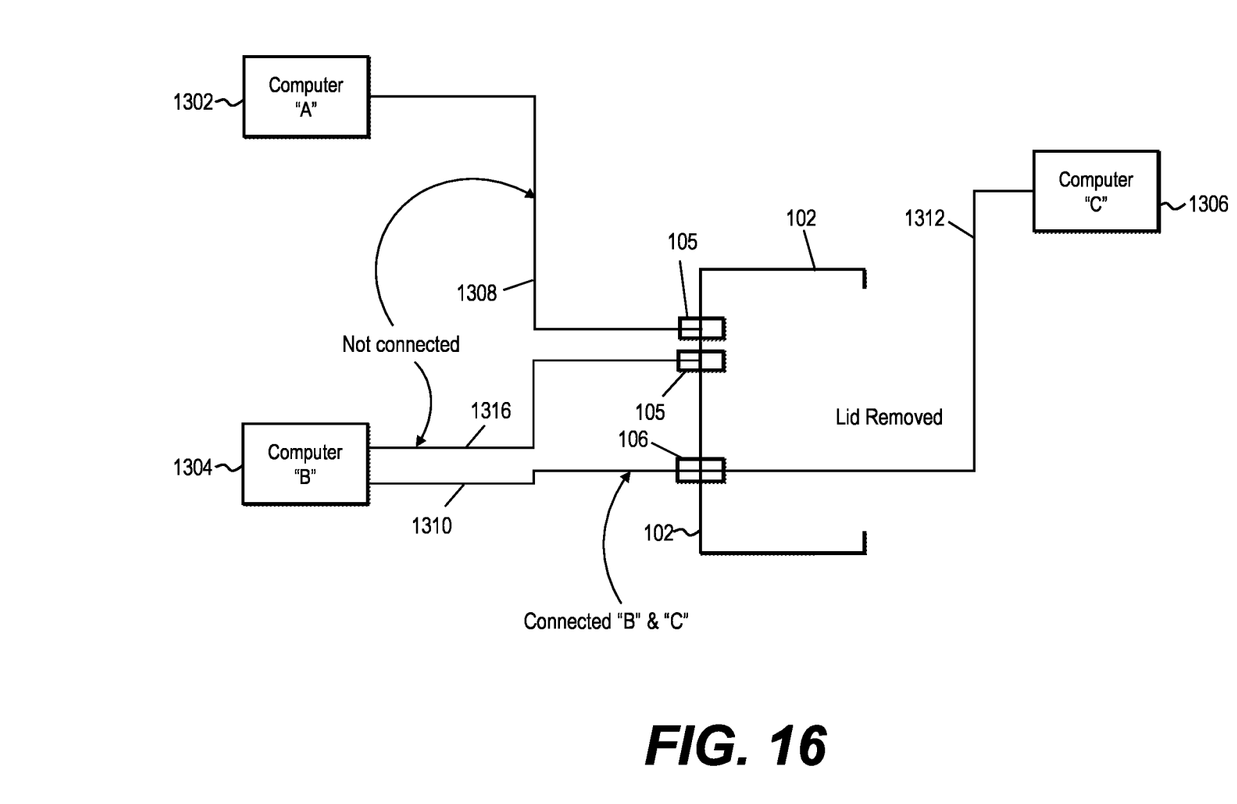
FIG. 16 shows another example of a connection diagram with multiple computers/networks when the switch box is open according to aspects of the disclosure.

FIG. 16 another example based on FIG. 15 of a connection diagram of computers and/or networks 1302, 1304, and 1306 with an open lid. In this case, computer 1306 is connected to pass-through connector 106 as a maintenance/access port, which provides networking between computer 1304 and computer 1306 (i.e., a "B"-"C" network). Further, since the lid 103 and the jumper assembly 1314 are removed, this ensures that computer/network "A" 1302 is always isolated from network,/computer "C" 1306.

The present box 100 may be also then used for a methodology of quick and convenient coupling/connecting or isolating of computers/network in different states. A method may include, based on the examples of FIGS. 13-16 above, connecting a computer/network "A" to the switch box to a particular connector of the box. Next, a computer/network "B" may be connected to another connector of the box, wherein the connection between "A" and "B" are required to be either connected or disconnected. Additionally, the switch box, once connected to the computers/networks, may be physically mounted in a location allowing human access. The lid of the box with the jumper assembly described herein may be then connected to quickly connect/couple computers/networks "A" and "B". Similarly, the networks/computers can be easily and quickly disconnected or isolated with removal of the lid.

In other aspects, the present switch box may serve to reduce access time when having to isolate a computer/network/hardware. Isolation and access can now be accomplished in seconds. The labor costs are also reduced by not having to remove the hardware, require inspection prior to installation, and reinstalling the computer/hardware.

A non-limiting list of alternative uses for the inventive switch box includes a safety cut off switch (non-high power)—when lid is removed, operation connection is disabled; and disables power (low power; or a connectivity/maintenance port for different types of connections with single connection (serial port or connection). If the network/computer hardware has only one serial connection and that serial connection is required for operation of the system/hardware, then the serial has to be wired up direct and removed for access/maintenance. In a serial port switch box configuration, the jumper built into the lid would be a serial port connector and when removed, serial communication access is available, possibly for debugging. When access is no longer required, the switch box lid is attached closing the connection between the hardware and the system While described with particular configurations and connectors, those skilled in the art will appreciate that the switch box enclosure size can be adapted to various connectors and connections. In the serial example above, the switch box would have just the serial jumper installed and nothing else so that the box can be small. In a complex switch box configuration, multiple types of connectors and connections can be combined to isolate and access simultaneously. In a complex switch box configuration, the box can be used as a master maintenance/access panel that can be connected to multiple computers/hardware/networks and yields the one stop access panel/port for a complex system to reduced time and labor to gain access to each hardware independently.

In yet further aspects, the disclosed switch box can be converted to a fiber connection and used for a lockout tag for a secure internet protocol router (SIPR) network switch. With a fiber jumper attached to the lid and the lid mounting hardware change to symmetry, the lid in an up/down configuration will enable/disable the SIPR connection to the terminal. In some aspects, such an alternative may be configured such that when the lid label is right side up, the connection is enabled, similar to an open and close magnet on a security safe. Possibly even two lids may be utilized: one for enabled and one for disabled. The switch box would be ideal for fiber so that the fiber lead is not bent or damaged with being connected or disconnected. Advantages include the reduction in cost from not having to replace the fiber cable due to damage.

Although the invention has been described in detail with reference to certain preferred embodiments, variations and modifications exist within the spirit and scope of the invention as described and defined in the following claims.

The invention claimed is:

1. A network switch box for quick coupling and/or isolation of network connections, the network switch box comprising:
a housing having an exterior portion and an interior portion;
a first feedthrough network connector having first and second coupling ends and affixed in the housing, wherein the first feedthrough network connector is configured to accept network connections at both the exterior portion of the housing at a first coupling end and the interior portion of the housing at a second coupling end;
a second feedthrough network connector having third and fourth coupling ends and affixed in the housing, wherein the second feedthrough network connector is configured to accept network connections at both the exterior portion of the housing at the third coupling end and the interior volume of the housing at the fourth coupling end;
a lid configured to be removably connected to the housing wherein the interior portion of the housing is enclosed and inaccessible when the lid is connected; and
a jumper assembly affixed to a side of the lid configured to face the interior portion of the housing, the jumper assembly including first and second jumper network connectors that are electrically connected as a straight pass-through between the first and second jumper network connectors, wherein the first and second jumper network connectors are positioned to be aligned with the second and fourth coupling ends of the first and second feedthrough network connectors and communicatively couple with the second and fourth coupling ends when the lid is connected to the housing.

2. The network switch box of claim 1, wherein the jumper assembly further comprises:
a printed circuit board including conductors or traces that are configured as a straight pass-through between the first and second jumper network connectors, wherein the first and second jumper network connectors are affixed to the printed and coupled to the conductors or traces.

3. The network switch box of claim 2, wherein the lid comprises a jumper assembly mounting fixture configured to fixedly mount the printed circuit board to the lid.

4. The network switch box of claim 1, wherein each of the first and second feedthrough network connectors are configured to operate as network maintenance/access ports that accept network cable connections within the interior portion of the housing when the lid is removed.

5. The network switch box of claim 1, further comprising:
a third feedthrough network connector having fifth and sixth coupling ends and affixed in the housing, wherein the third feedthrough network connector is configured to accept network connections at both the exterior portion of the housing at a first coupling end and the interior portion of the housing at a second coupling end.

6. The network switch box of claim 5, wherein the third feedthrough network connector is configured to operate as network maintenance/access port that accepts network cable connections within the interior portion of the housing when the lid is removed.

7. The network switch box of claim 5, wherein the third feedthrough network connector is affixed in the housing at a rotation orientation different from the first and second feedthrough network connectors.

8. The network switch box of claim 7, wherein the rotation orientation of the third feedthrough network connector is configured to not align with the first and second jumper network connectors of the jumper assembly.

9. The network switch box of claim 1, further comprising a plurality of fastening devices configured for quick removal of the lid.

10. The network switch box of claim 9, wherein the plurality of fastening devices comprises knurled screws allowing hand operation.

11. A network switch box for quick coupling and/or isolation of network connections, the network switch box comprising:
a housing having an exterior portion and an interior portion;
a first feedthrough network connector having first and second coupling ends and affixed in the housing, wherein the first feedthrough network connector is configured to accept network cable connections at both the exterior portion of the housing at a first coupling end and the interior portion of the housing at a second coupling end;
a second feedthrough network connector having third and fourth coupling ends and affixed in the housing, wherein the second feedthrough network connector is configured to accept network cable connections at both the exterior portion of the housing at the third coupling end and the interior volume of the housing at the fourth coupling end;
a lid configured to be removably connected to the housing wherein the interior portion of the housing is enclosed and inaccessible when the lid is connected;
a jumper assembly affixed to a side of the lid configured to face the interior portion of the housing, the jumper assembly including first and second jumper network connectors that are electrically coupled together, wherein the first and second jumper network connectors are positioned to be aligned with the second and fourth coupling ends of the first and second feedthrough network connectors and connect with the second and fourth coupling ends when the lid is connected to the housing; and
one or more third feedthrough network connectors having two coupling ends and affixed in the housing, wherein the third feedthrough network connector is configured to accept network cable connections to a first computer connected with a network cable to one of the two coupling ends and to a second computer connected with a network cable to the other of the two coupling ends when the lid is absent.

12. The network switch box of claim 11, wherein the jumper assembly further comprises:
a printed circuit board including conductors or traces that are configured as a straight pass-through between the first and second jumper network connectors, wherein the first and second jumper network connectors are affixed to the printed and coupled to the conductors or traces.

13. The network switch box of claim 12, wherein the lid comprises a jumper assembly mounting fixture configured to fixedly mount the printed circuit board to the lid.

14. The network switch box of claim 11, wherein each of the first and second feedthrough network connectors are configured to operate as network maintenance/access ports that accept network cable connections within the interior portion of the housing when the lid is removed.

15. The network switch box of claim 11, wherein the third feedthrough network connector is affixed in the housing at a rotation orientation different from the first and second feedthrough network connectors.

16. The network switch box of claim 15, wherein the rotation orientation of the third feedthrough network connector is configured to not align with the first and second jumper network connectors of the jumper assembly.

17. The network switch box of claim 11, further comprising a plurality of fastening devices configured for quick removal of the lid.

18. The network switch box of claim 17, wherein the plurality of fastening devices comprises knurled screws allowing hand operation.

* * * * *